(12) United States Patent
Smaling et al.

(10) Patent No.: US 6,702,991 B1
(45) Date of Patent: Mar. 9, 2004

(54) APPARATUS AND METHOD FOR REDUCING POWER CONSUMPTION OF A PLASMA FUEL REFORMER

(75) Inventors: Rudolf M. Smaling, Bedford, MA (US); Michael J. Daniel, Indianapolis, IN (US); Shawn D. Bauer, Indianapolis, IN (US)

(73) Assignee: Arvin Technologies, Inc., Troy, MI (US)

( * ) Notice: Subject to any disclaimer, the term of this patent is extended or adjusted under 35 U.S.C. 154(b) by 0 days.

(21) Appl. No.: 10/292,328

(22) Filed: Nov. 12, 2002

(51) Int. Cl.$^7$ ................................................ B01J 19/08
(52) U.S. Cl. ............................ 422/186.21; 422/186.22; 422/186.28; 123/3
(58) Field of Search ........................ 422/186.21, 186.22, 422/186.28; 123/3

(56) References Cited

U.S. PATENT DOCUMENTS

| | | |
|---|---|---|
| 2,787,730 A | 4/1957 | Berghaus et al. |
| 3,018,409 A | 1/1962 | Berghaus et al. |

(List continued on next page.)

FOREIGN PATENT DOCUMENTS

| | | |
|---|---|---|
| DE | 30 48 540 | 7/1982 |
| DE | 237120 A1 | 7/1986 |
| DE | 195 10 804 | 9/1996 |
| DE | 19644864 A1 | 5/1998 |
| DE | 19644864 | 5/1998 |
| DE | 197 57 936 | 7/1999 |
| DE | 19927518 | 1/2001 |
| EP | 0096538 | 12/1983 |
| EP | 0485922 A1 | 5/1992 |
| EP | 0153116 | 8/1995 |
| EP | 1030395 | 8/2000 |
| EP | 1057998 | 12/2000 |
| FR | 2593493 | 7/1987 |
| FR | 2620436 | 3/1989 |
| GB | 355210 | 2/1930 |
| GB | 1221317 | 2/1971 |
| GB | 2241746 | 9/1991 |
| JP | 51 27630 | 3/1976 |
| JP | 51 27630 | 8/1976 |
| JP | 02 121300 | 5/1990 |
| JP | 03195305 | 8/1991 |
| JP | 05 231242 | 9/1993 |
| SU | 1519762 | 11/1989 |
| WO | WO 85/00159 | 1/1985 |
| WO | WO 94/03263 | 2/1994 |
| WO | WO 95/06194 | 3/1995 |
| WO | WO 96/24441 | 8/1996 |
| WO | WO 98/45582 | 10/1998 |
| WO | WO 00/26518 A1 | 5/2000 |
| WO | WO 00/26518 | 5/2000 |
| WO | WO 01/14698 A1 | 3/2001 |
| WO | WO 01/14702 A1 | 3/2001 |
| WO | WO 01/33056 A1 | 5/2001 |

OTHER PUBLICATIONS

Jahn, "Physics of Electric Propulsion", pp. 126–130 (1968).
Belogub et al., "Petrol–Hydrogen Truck With Load–Carrying Capacity 5 Tons", Int. J. Hydrogen Energy, vol. 16, No. 6, pp. 423–426 (1991).

(List continued on next page.)

Primary Examiner—Kishor Mayekar
(74) Attorney, Agent, or Firm—Barnes & Thornburg

(57) ABSTRACT

A fuel reforming assembly has a control unit electrically coupled to a temperature sensor to determine the temperature of a catalyst positioned in the reaction chamber of a plasma fuel reformer. Based on the temperature of the catalyst, operation of the reformer's plasma-generating assembly may be selectively actuated and deactuated. A method of operating a plasma fuel reformer is also disclosed

18 Claims, 3 Drawing Sheets

U.S. PATENT DOCUMENTS

| | | |
|---|---|---|
| 3,035,205 A | 5/1962 | Berghaus et al. |
| 3,423,562 A | 1/1969 | Jones et al. |
| 3,594,609 A | 7/1971 | Vas |
| 3,622,493 A | 11/1971 | Crusco |
| 3,649,195 A | 3/1972 | Cook et al. |
| 3,755,131 A | 8/1973 | Shalit |
| 3,779,182 A | 12/1973 | Camacho |
| 3,841,239 A | 10/1974 | Nakamura et al. |
| 3,879,680 A | 4/1975 | Naismith et al. |
| 3,894,605 A | 7/1975 | Salvadorini |
| 3,982,962 A | 9/1976 | Bloomfield |
| 3,992,277 A | 11/1976 | Trieschmann et al. |
| 4,033,133 A | 7/1977 | Houseman et al. |
| 4,036,131 A | 7/1977 | Elmore |
| 4,036,181 A | 7/1977 | Matovich |
| 4,059,416 A | 11/1977 | Matovich |
| 4,099,489 A | 7/1978 | Bradley |
| 4,144,444 A | 3/1979 | Dementiev et al. |
| 4,168,296 A | 9/1979 | Lundquist |
| 4,339,546 A | 7/1982 | Randalls |
| 4,436,793 A | 3/1984 | Adlhart |
| 4,458,634 A | 7/1984 | Carr et al. |
| 4,469,932 A | 9/1984 | Spiegelberg et al. |
| 4,473,622 A | 9/1984 | Chludzinski et al. |
| 4,522,894 A | 6/1985 | Hwang et al. |
| 4,578,955 A | 4/1986 | Medina |
| 4,625,511 A | 12/1986 | Scheitlin et al. |
| 4,625,681 A | 12/1986 | Sutekiyo |
| 4,645,521 A | 2/1987 | Freesh |
| 4,651,524 A | 3/1987 | Brighton |
| 4,657,829 A | 4/1987 | McElroy et al. |
| 4,830,492 A | 5/1989 | Ko |
| 4,841,925 A | 6/1989 | Ward |
| 4,928,227 A | 5/1990 | Burba et al. |
| 4,963,792 A | 10/1990 | Parker |
| 4,967,118 A | 10/1990 | Urataki et al. |
| 5,095,247 A | 3/1992 | Hanamura |
| 5,138,959 A | 8/1992 | Kulkarni |
| 5,143,025 A | 9/1992 | Munday |
| 5,159,900 A | 11/1992 | Damman |
| 5,205,912 A | 4/1993 | Murphy |
| 5,207,185 A | 5/1993 | Greiner et al. |
| 5,212,431 A | 5/1993 | Origuchi et al. |
| 5,228,529 A | 7/1993 | Rosner |
| 5,272,871 A | 12/1993 | Oshima et al. |
| 5,284,503 A | 2/1994 | Bitler et al. |
| 5,293,743 A | 3/1994 | Usleman et al. |
| 5,317,996 A | 6/1994 | Lansing |
| 5,362,939 A | 11/1994 | Hanus et al. |
| 5,409,784 A | 4/1995 | Bromberg et al. |
| 5,409,785 A | 4/1995 | Nakano et al. |
| 5,412,946 A | 5/1995 | Oshima et al. |
| 5,425,332 A | 6/1995 | Rabinovich et al. |
| 5,437,250 A | 8/1995 | Rabinovich et al. |
| 5,441,401 A | 8/1995 | Yamaguro et al. |
| 5,445,841 A | 8/1995 | Arendt et al. |
| 5,451,740 A | 9/1995 | Hanus et al. |
| 5,560,890 A | 10/1996 | Berman et al. |
| 5,599,758 A | 2/1997 | Guth et al. |
| 5,660,602 A | 8/1997 | Collier, Jr. et al. |
| 5,666,923 A | 9/1997 | Collier, Jr. et al. |
| 5,787,864 A | 8/1998 | Collier, Jr. et al. |
| 5,813,222 A | 9/1998 | Appleby |
| 5,826,548 A | 10/1998 | Richardson, Jr. |
| 5,845,485 A | 12/1998 | Murphy et al. |
| 5,847,353 A | 12/1998 | Titus et al. |
| 5,852,927 A | 12/1998 | Cohn et al. |
| 5,887,554 A | 3/1999 | Cohn et al. |
| 5,894,725 A | 4/1999 | Cullen et al. |
| 5,910,097 A | 6/1999 | Boegner et al. |
| 5,921,076 A | 7/1999 | Krutzsch et al. |
| 5,974,791 A | 11/1999 | Hirota et al. |
| 6,012,326 A | 1/2000 | Raybone et al. |
| 6,014,593 A | 1/2000 | Grufman |
| 6,047,543 A | 4/2000 | Caren et al. |
| 6,048,500 A | 4/2000 | Caren et al. |
| 6,082,102 A | 7/2000 | Wissler et al. |
| 6,122,909 A | 9/2000 | Murphy et al. |
| 6,125,629 A | 10/2000 | Patchett |
| 6,130,260 A | 10/2000 | Hall et al. |
| 6,134,882 A | 10/2000 | Hynh et al. |
| 6,152,118 A | 11/2000 | Sasaki et al. |
| 6,176,078 B1 | 1/2001 | Balko et al. |
| 6,235,254 B1 | 5/2001 | Murphy et al. |
| 6,248,684 B1 | 6/2001 | Yavuz et al. |
| 6,284,157 B1 | 9/2001 | Eliasson et al. |
| 6,311,232 B1 | 10/2001 | Cagle et al. |
| 6,322,757 B1 | 11/2001 | Cohn et al. |
| 6,390,030 B1 * | 5/2002 | Isogawa et al. ............... 123/3 |
| 2002/0012618 A1 | 1/2002 | Bromberg et al. |
| 2002/0194835 A1 | 12/2002 | Bromberg et al. |

OTHER PUBLICATIONS

Breshears et al., "Partial Hydrogen Injection Into Internal Combustion Engines", Proceedings of the EPA $1^{st}$ Symposium on Low Pollution Power Systems and Development, Ann Arbor, MI, pp. 268–277 (Oct. 1973).

Chuvelliov et al., "Comparison of Alternative Energy Technologies Utilizing Fossil Fuels and Hydrogen Based on Their Damage to Population and Environment in the USSR and East Europe", pp. 269–300.

Correa, "Lean Premixed Combustion for Gas–Turbines: Review and Required Research", PD–vol. 33, Fossile Fuel Combustion, ASME, pp. 1–9 (1991).

Czernichowski et al., "Multi–Electrodes High Pressure Gliding Discharge Reactor and its Applications for Some Waste Gas and Vapor Incineration", Proceedings of Workshop on Plasma Destruction of Wastes, France, pp. 1–13 (1990).

Das, "Exhaust Emission Characterization of Hydrogen–Operated Engine System: Nature of Pollutants and their Control Techniques", Int. J. Hydrogen Energy, vol. 16, No. 11, 765–775 (1991).

Das, "Hydrogen Engines: A View of the Past and a Look into the Future", Int. J. of Hydrogen Energy, vol. 15, No. 6, pp. 425–443 (1990).

Das, "Fuel Induction Techniques for a Hydrogen Operated Engine", Int. J. of Hydrogen Energy, vol. 15, No. 11 (1990).

DeLuchi, "Hydrogen Vehicles: An Evaluation of Fuel Storage, Performance, Safety, Environmental Implants and Costs", Int. J. Hydrogen Energy, vol. 14, No. 2, pp. 81–130 (1989).

Duclos et al., "Diagnostic Studies of a Pinch Plasma Accelerator", AIAA Journal, vol. 1, No. 11, pp. 2505–2513 (Nov. 1963).

Feucht et al., "Hydrogen Drive for Road Vehicles—Results from the Fleet Test Run in Berlin", Int. J. Hydrogen Energy, vol. 13, No. 4, pp. 243–250 (1988).

Finegold et al., "Dissociated Methanol as a Consumable Hydride for Automobiles and Gas Turbines", pp. 1359–1369, Advances in Hydrogen Energy 3 (Jun. 13–17, 1982).

Hall et al., "Initial Studies of a New Type of Ignitor: The Railplug"—SAE Paper 912319, pp. 1730–1746 (1991).

Houseman et al., "Hydrogen Engines Based On Liquid Fuels, A Review", G.E., Proc., 3$^{rd}$ World Hydrogen Energy Conf., pp. 949–968 (1980).

Houseman, et al., "Two Stage Combustion for Low Emissions Without Catalytic Converters", Proc. of Automobile Engineering Meeting, Dearborn, MI, pp. 1–9 (Oct. 18–22, 1976).

Jones, et al., "Exhaust Gas Reforming of Hydrocarbon Fuels", Soc. of Automotive Engineers, Paper 931086, pp. 223–234 (1993).

Kaske et al., "Hydrogen Production by the Hüls Plasma–Reforming Process", Proc. VI World Hydrogen Energy Conference, vol. 1, pp. 185–190 (1986).

MacDonald, "Evaluation of Hydrogen–Supplemented Fuel Concept with an Experimental Multi–Cylinder Engine", Society of Automotive Engineers, Paper 760101, pp. 1–16 (1976).

Mackay, "Development of a 24 kW Gas Turbine–Driven Generator Set for Hybrid Vehicles", 940510, pp. 99–105, NoMac Energy Systems, Inc.

Mackay, "Hybrid Vehicle Gas Turbines", 930044, pp. 35–41, NoMac Energy Systems, Inc.

Matthews et al., "Further Analysis of Railplugs as a New Type of Ignitor", SAE Paper 922167, pp. 1851–1862 (1992).

Mischenko et al., "Hydrogen as a Fuel for Roads Vehicles", Proc. VII World Hydrogen Energy Conference, vol. 3, pp. 2037–2056 (1988).

Monroe et al., "Evaluation of a Cu/Zeolite Catalyst to Remove NOx from Lean Exhaust", Society of Automotive Engineers, Paper 930737, pp. 195–203 (1993).

Rabinovich et al., "On Board Plasmatron Generation of Hydrogen Rich Gas for Engine Pollution Reduction", Proceedings of NIST Workshop on Advanced Components for Electric and Hybrid Electric Vehicles, Gaithersburg, MD, pp. 83–88 (Oct. 1993) (not published).

Rabinovich et al., "Plasmatron Internal Combustion Engine System for Vehicle Pollution Reduction", Int. J. of Vehicle Design, vol. 15, Nos. 3/4/5, pp. 234–242 (1994).

Scott et al., "Hydrogen Fuel Breakthrough with On–Demand Gas Generator", 372 Automotive Engineering, vol. 93, No. 8, Warrendale, PA, U.S.A., pp. 81–84 (Aug. 1985).

Shabalina et al., "Slag Cleaning by Use of Plasma Heating", pp. 1–7.

Handbook of Thermodynamic High Temperature Process Data, pp. 507–547.

Varde et al., "Reduction of Soot in Diesel Combustion with Hydrogen and Different H/C Gaseous Fuels", Hydrogen Energy Progress V, pp. 1631–1639.

Wang et al., "Emission Control Cost Effectiveness of Alternative–Fuel Vehicles", Society of Automotive Engineers, Paper 931786, pp. 91–122 (1993).

Wilson, "Turbine Cars", Technology Review, pp. 50–56 (Feb./Mar., 1995).

Kirwan, "Fast Start–Up On–Board Gasoline Reformer for Near Zero Emissions in Spark–Ignition Engines", Society of Automotive Engineers World Congress, Detroit, MI (Mar. 4–7, 2002), Paper No. 2002–01–1011.

Kirwan, "Development of a Fast Start–up O Gasoline Reformer for Near Zero Spark–Ignition Engines", Delphi Automotive Systems, pp. 1–21 (2002).

Chandler, "Device May Spark Clean–Running Cars", The Boston Globe, p. E1 (Jul. 12, 1999).

Simanaitis, "Whither the Automobile?", Road and Track, pp. 98–102 (Sep. 2001).

Shelef, "Twenty–five Years after Introduction of Automotive Catalysts: What Next?" Journal of Catalysis Today 62, pp. 35–50 (2000).

Stokes, "A Gasoline Engine Concept for Improved Fuel Economy—The Lean Boost System", International Falls Fuels and Lubricants Meeting and Exposition, Baltimore, MD, SAE Technical Paper Series, 14 pages (Oct. 16–19, 2000).

Tachtler,"Fuel Cell Auxiliary Power Unit—Innovation for the Electric Supply of Passenger Cars?", Society of Automotive Engineers, Paper No. 2000–01–0374, pp. 109–117 (2000).

Bromberg, "Experimental Evaluation of SI Engine Operation Supplemented by Hydrogen Rich Gas from a Compact Plasma Boosted Reformer", Massachusetts Institute of Technology Plasma Science and Fusion Center Report, JA–99–32 (1999).

Bromberg, "Compact Plasmatron–Boosted Hydrogen Generation Technology for Vehicular Applications", Int. J. of Hydrogen Energy 24, pp. 341–350 (1999).

Bromberg, "Emissions Reductions Using Hydrogen from Plasmatron Fuel Converters", Int. J. of Hydrogen Energy 26, pp. 1115–1121 (2001).

Burch, "An Investigation of the $NO/H_2/O_2$ Reaction on Noble–Metal Catalysts at Low Temperatures Under Lean–Burn Conditions," Journal of Applied Catalysis B: Environmental 23, pp. 115–121 (1999).

Costa, "An Investigation of the $NO/H_2/O_2$ (Lean De–$No_x$) Reaction on a Highly Active and Selective $Pt/La_{0.7}Sr_{0.2}Ce_{0.1}FeO_3$ Catalyst at Low Temperatures", Journal of Catalysis 209, pp. 456–471 (2002).

Frank, "Kinetics and Mechanism of the Reduction of Nitric Oxides by $H_2$ Under Lean–Burn Conditions on a Pt–Mo–Co/ á–$Al_2O_3$ Catalyst", Journal of Applied Catalysis B: Environmental 19, pp. 45–57 (1998).

Gore, "Hydrogen A Go–Go", Discover, pp. 92–93, (Jul., 1999).

Koebel, "Selective Catalytic Reduction of NO and $NO_2$ at Low Temperatures", Journal of Catalysis Today 73, pp. 239–247 (2002).

Nanba, "Product Analysis of Selective Catalytic Reduction of $NO_2$ with $C_2H_4$ Over H–Ferrierite", Journal of Catalysis 211, pp. 53–63 (2002).

* cited by examiner

APPARATUS AND METHOD FOR REDUCING POWER CONSUMPTION OF A PLASMA FUEL REFORMER

FIELD OF THE DISCLOSURE

The present disclosure relates generally to a control system for a fuel reformer, and more particularly to a control system for reducing power consumption of a plasma fuel reformer.

BACKGROUND OF THE DISCLOSURE

Plasma fuel reformers reform hydrocarbon fuel into a reformate gas such as hydrogen-rich gas. In the case of an onboard plasma fuel reformer of a vehicle or stationary power generator, the reformate gas produced by the reformer may be utilized as fuel or fuel additive in the operation of an internal combustion engine. The reformate gas may also be utilized to regenerate or otherwise condition an emission abatement device associated with the internal combustion engine or as a fuel for a fuel cell.

SUMMARY OF THE DISCLOSURE

According to one aspect of the present disclosure, there is provided a method of operating a fuel reformer that includes determining the temperature of a catalyst associated with the fuel reformer and adjusting operation of a plasma arc generating assembly of the fuel reformer based thereon.

In one specific implementation of this method, the temperature of the catalyst is sensed with a temperature sensor. If the temperature of the catalyst exceeds a predetermined temperature value, the plasma arc generating assembly is deactuated such that the plasma arc ceases to be generated. If the temperature of the catalyst subsequently falls below the predetermined temperature value, the plasma arc generating assembly is actuated such that generation of the plasma arc is resumed.

In accordance with another aspect of the present disclosure, there is provided a fuel reforming assembly having a control unit electrically coupled to both a fuel reformer and a temperature sensor. The control unit is configured to communicate with the temperature sensor to determine the temperature of a catalyst associated with the fuel reformer and then adjust the operation of a plasma arc generating assembly associated with the fuel reformer based thereon.

In one specific implementation, the control unit operates the plasma arc generating assembly so cease generation of a plasma arc if the temperature of the catalyst exceeds a predetermined temperature value. If the temperature of the catalyst subsequently falls below the predetermined temperature value, the control unit operates the plasma arc generating assembly that generation of the plasma arc is resumed.

DETAILED DESCRIPTION OF ILLUSTRATIVE EMBODIMENTS

Figure 1:
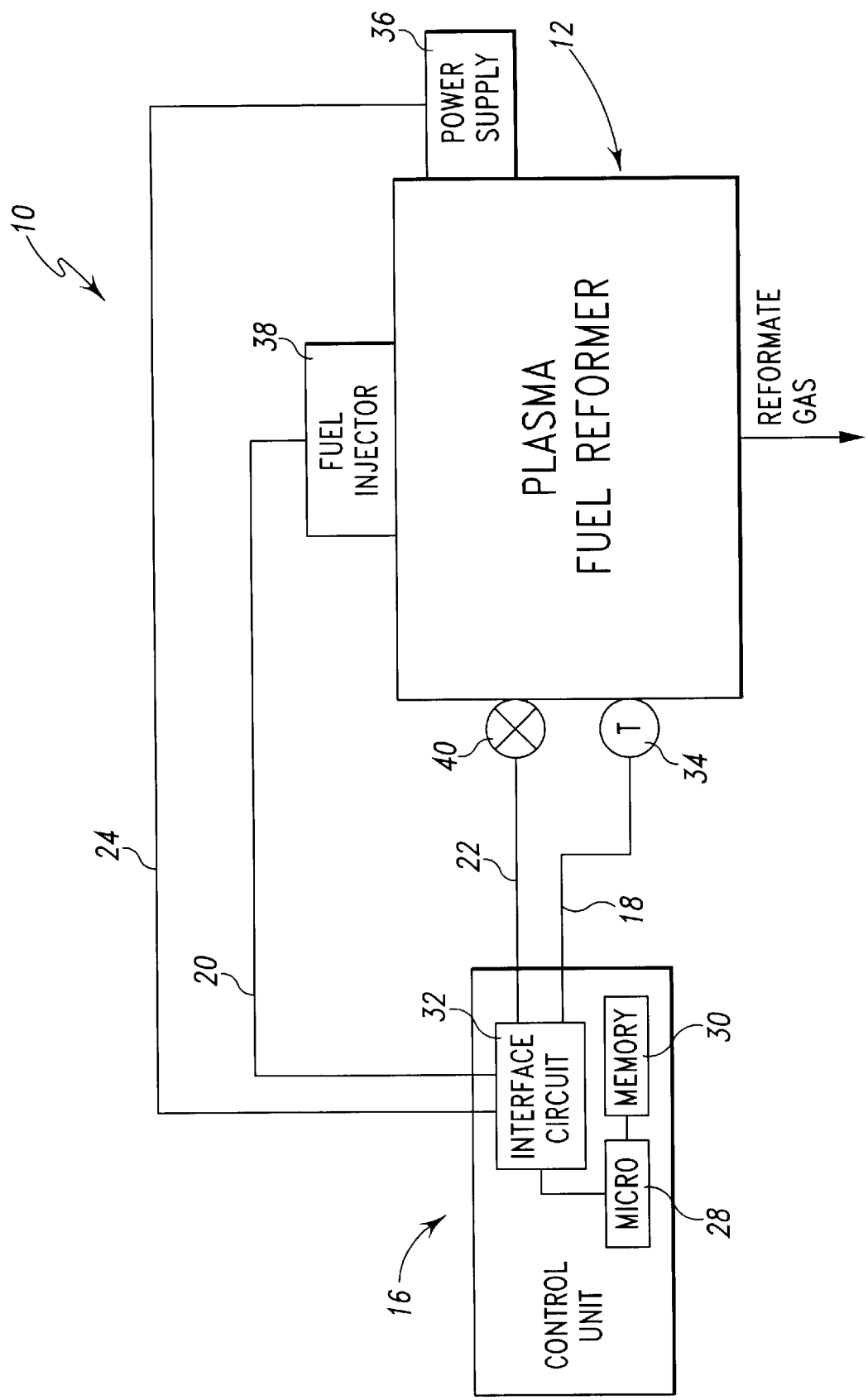
FIG. 1 is a simplified block diagram of a fuel reforming assembly having a plasma fuel reformer under the control of an electronic control unit.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

Figure 2:
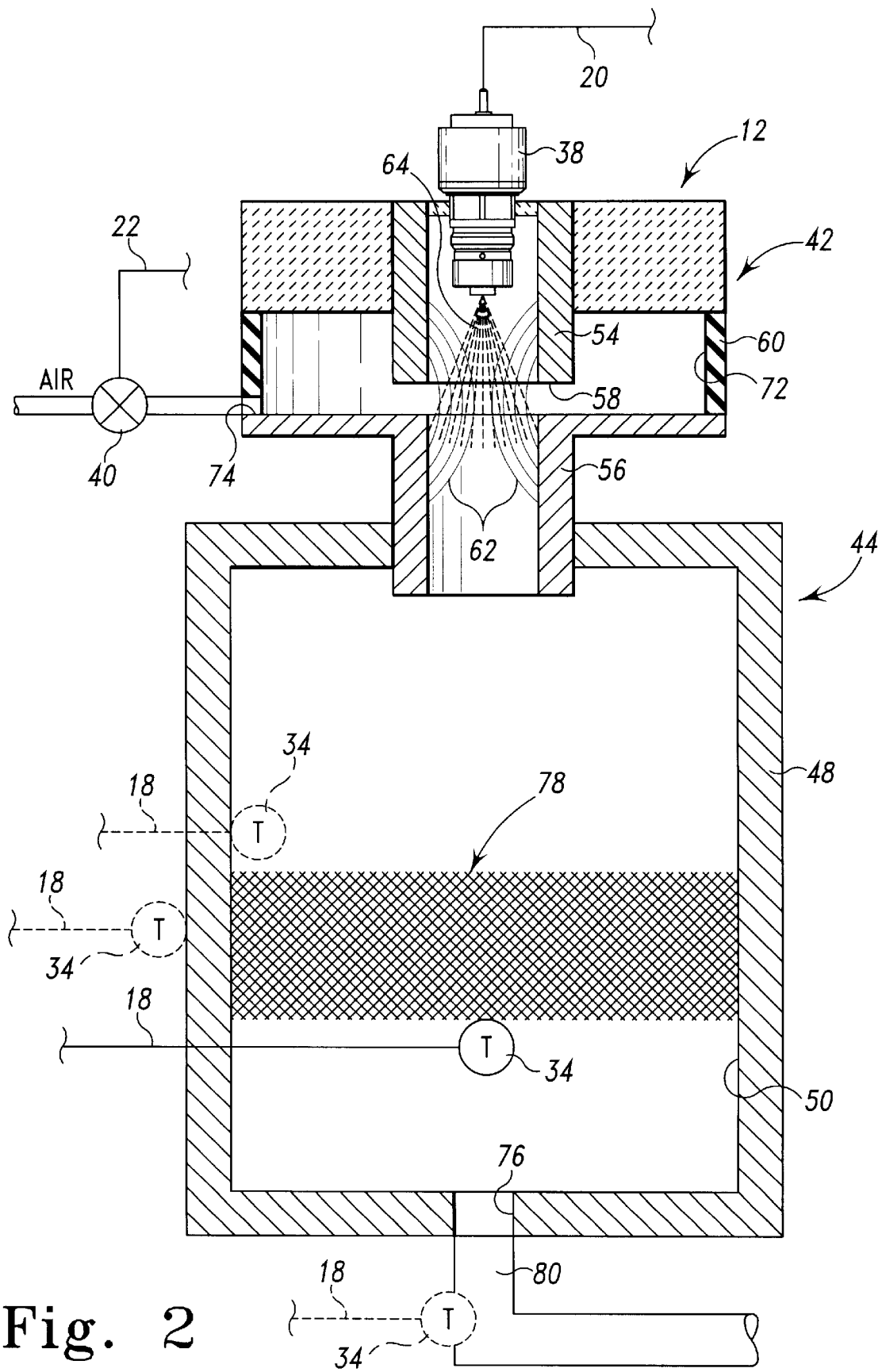
FIG. 2 is a diagrammatic cross sectional view of the plasma fuel reformer of FIG. 1.

Referring now to FIGS. 1 and 2, there is shown a fuel reforming assembly 10 having a plasma fuel reformer 12 and a control unit 16. The plasma fuel reformer 12 reforms (i.e., converts) hydrocarbon fuels into a reformate gas that includes, amongst other things, hydrogen and carbon monoxide. As such, the plasma fuel reformer 12, amongst other uses, may be used in the construction of an onboard fuel reforming system of a vehicle or stationary power generator. In such a way, the reformate gas produced by the plasma fuel reformer 12 may be utilized as fuel or fuel additive in the operation of an internal combustion engine thereby increasing the efficiency of the engine while also reducing emissions produced by the engine. The reformate gas from the plasma fuel reformer 12 may also be utilized to regenerate or otherwise condition an emission abatement device associated with the internal combustion engine. In addition, if the vehicle or the stationary power generator is equipped with a fuel cell such as, for example, an auxiliary power unit (APU), the reformate gas from the plasma fuel reformer 12 may also be used as a fuel for the fuel cell. Systems including plasma fuel reformers are disclosed in U.S. Pat. No. 5,425,332 issued to Rabinovich et al.; U.S. Pat. No. 5,437,250 issued to Rabinovich et al.; U.S. Pat. No. 5,409,784 issued to Bromberg et al.; and U.S. Pat. No. 5,887,554 issued to Cohn, et al., the disclosures of each of which is hereby incorporated by reference.

As shown in FIG. 2, the plasma fuel reformer 12 includes a plasma-generating assembly 42 and a reactor 44. The reactor 44 includes a reactor housing 48 having a reaction chamber 50 defined therein. The plasma-generating assembly 42 is secured to an upper portion of the reactor housing 48. The plasma-generating assembly 42 includes an upper electrode 54 and a lower electrode 56. The electrodes 54, 56 are spaced apart from one another so as to define an electrode gap 58 therebetween. An insulator 60 electrically insulates the electrodes from one another.

The electrodes 54, 56 are electrically coupled to an electrical power supply 36 (see FIG. 1) such that, when energized, an electrical current is supplied to one of the electrodes thereby generating a plasma arc 62 across the electrode gap 58 (i.e., between the electrodes 54, 56). A fuel input mechanism such as a fuel injector 38 injects a hydrocarbon fuel 64 into the plasma arc 62. The fuel injector 38 may be any type of fuel injection mechanism which injects a desired amount of fuel into plasma-generating assembly 42. In certain configurations, it may be desirable to atomize the fuel prior to, or during, injection of the fuel into the plasma-generating assembly 42. Such fuel injector assemblies (i.e., injectors which atomize the fuel) are commercially available.

As shown in FIG. 2, the plasma-generating assembly 42 has an annular air chamber 72. Pressurized air is advanced into the air chamber 72 through an air inlet 74 and is thereafter directed radially inwardly through the electrode gap 58 so as to "bend" the plasma arc 62 inwardly. Such bending of the plasma arc 62 ensures that the injected fuel 64 is directed through the plasma arc 62. Such bending of the plasma arc 62 also reduces erosion of the electrodes 56, 58. Moreover, advancement of air into the electrode gap 58 also produces a desired mixture of air and fuel ("air/fuel mixture"). In particular, the plasma reformer 12 reforms or otherwise processes the fuel in the form of a mixture of air and fuel. The air-to-fuel ratio of the mixture being reformed by the fuel reformer is controlled via control of an air inlet valve 40. The air inlet valve 40 may be embodied as any type of electronically-controlled air valve. The air inlet valve 40 may be embodied as a discrete device, as shown in FIG. 2, or may be integrated into the design of the plasma fuel reformer 12. In either case, the air inlet valve 40 controls the amount of air that is introduced into the plasma-generating assembly 42 thereby controlling the air-to-fuel ratio of the air/fuel mixture being processed by the plasma fuel reformer 12.

The lower electrode 56 extends downwardly into the reactor housing 48. As such, gas (either reformed or partially reformed) exiting the plasma arc 62 is advanced into the reaction chamber 50. A catalyst 78 is positioned in the reaction chamber 50. The catalyst 78 completes the fuel reforming process, or otherwise treats the gas, prior to exit of the reformate gas through a gas outlet 76. In particular, some or all of the gas exiting the plasma-generating assembly 42 may only be partially reformed, and the catalyst 78 is configured to complete the reforming process (i.e., catalyze a reaction which completes the reforming process of the partially reformed gas exiting the plasma-generating assembly 42). The catalyst 78 may be embodied as any type of catalyst that is configured to catalyze such reactions. In one exemplary embodiment, the catalyst 78 is embodied as substrate having a precious metal or other type of catalytic material disposed thereon. Such a substrate may be constructed of ceramic, metal, or other suitable material. The catalytic material may be, for example, embodied as platinum, rhodium, palladium, including combinations thereof, along with any other similar catalytic materials.

As shown in FIG. 2, the plasma fuel reformer 12 has a temperature sensor 34 associated therewith. The temperature sensor 34 is used to determine the temperature of the catalyst 78. The temperature sensor 34 may be located in any number of locations. In particular, as shown in solid lines, the temperature sensor 34 may be positioned within the reaction chamber 50 at location in operative contact with the catalyst 78 to sense the temperature of the catalyst 78. To do so, the temperature sensor 34 may be position in physical contact with the catalyst 78, or may be positioned a predetermined distance away from the catalyst 78, depending on the type and configuration of the temperature sensor.

Alternatively, the temperature of the catalyst 78 may be determined indirectly. In particular, as shown in phantom, the temperature sensor 34 may be positioned so as to sense the temperature of the reformate gas advancing through the reaction chamber 50 or a gas conduit 80 subsequent to being exhausted through the outlet 76. Further, as also shown in phantom, the temperature of either the inner surface or the outer surface of the reactor housing 48 may be sensed. In any such case, the indirect temperature sensed by the temperature sensor 34 is indicative of, or otherwise may be correlated to, the temperature of the catalyst 78. As such, the temperature set point for actuating and deactuaing the plasma-generating assembly 42 by the herein described methods and systems may be adjusted to account for the use of such an indirect temperature measurements.

Alternatively, the output from such an indirect temperature measurement may be extrapolated to a corresponding direct temperature or otherwise adjusted prior to input into the software routines of the herein described methods and systems.

Hence, it should be appreciated that the herein described concepts are not intended to be limited to any particular method or device for determining the temperature of the catalyst 78. In particular, the temperature of the catalyst 78 may be determined by use any type of temperature sensor, located in any sensor location, and utilizing any methodology (e.g., either direct or indirect) for obtaining temperature values associated with the catalyst 78.

As shown in FIG. 1, the plasma fuel reformer 12 and its associated components are under the control of the control unit 16. In particular, the temperature sensor 34 is electrically coupled to the electronic control unit 16 via a signal line 18, the fuel injector 38 is electrically coupled to the electronic control unit 16 via a signal line 20, the air inlet valve 40 is electrically coupled to the electronic control unit 16 via a signal line 22, and the power supply 36 is electrically coupled to the electronic control unit 16 via a signal line 24. Although the signal lines 18, 20, 22, 24 are shown schematically as a single line, it should be appreciated that the signal lines may be configured as any type of signal carrying assembly which allows for the transmission of electrical signals in either one or both directions between the electronic control unit 16 and the corresponding component. For example, any one or more of the signal lines 18, 20, 22, 24 may be embodied as a wiring harness having a number of signal lines which transmit electrical signals between the electronic control unit 16 and the corresponding component. It should be appreciated that any number of other wiring configurations may also be used. For example, individual signal wires may be used, or a system utilizing a signal multiplexer may be used for the design of any one or more of the signal lines 18, 20, 22, 24. Moreover, the signal lines 18, 20, 22, 24 may be integrated such that a single harness or system is utilized to electrically couple some or all of the components associated with the plasma fuel reformer 12 to the electronic control unit 16.

The electronic control unit 16 is, in essence, the master computer responsible for interpreting electrical signals sent by sensors associated with the plasma fuel reformer 12 and for activating electronically-controlled components associated with the plasma fuel reformer 12 in order to control the plasma fuel reformer 12. For example, the electronic control unit 16 of the present disclosure is operable to, amongst many other things, determine the beginning and end of each injection cycle of fuel into the plasma-generating assembly 42, calculate and control the amount and ratio of air and fuel to be introduced into the plasma-generating assembly 42, determine the temperature of the catalyst 78, determine the power level to supply to the plasma fuel reformer 12, etcetera.

To do so, the electronic control unit 16 includes a number of electronic components commonly associated with electronic units which are utilized in the control of electromechanical systems. For example, the electronic control unit 16 may include, amongst other components customarily included in such devices, a processor such as a microprocessor 28 and a memory device 30 such as a programmable read-only memory device ("PROM") including erasable PROM's (EPROM's or EEPROM's). The memory device 30 is provided to store, amongst other things, instructions in the form of, for example, a software routine (or routines) which, when executed by the processing unit, allows the electronic control unit 16 to control operation of the plasma fuel reformer 12.

The electronic control unit 16 also includes an analog interface circuit 32. The analog interface circuit 32 converts the output signals from the various fuel reformer sensors (e.g., the temperature sensor 34) into a signal which is suitable for presentation to an input of the microprocessor 28. In particular, the analog interface circuit 32, by use of an analog-to-digital (A/D) converter (not shown) or the like, converts the analog signals generated by the sensors into a digital signal for use by the microprocessor 28. It should be appreciated that the A/D converter may be embodied as a discrete device or number of devices, or may be integrated into the microprocessor 28. It should also be appreciated that if any one or more of the sensors associated with the plasma fuel reformer 12 generate a digital output signal, the analog interface circuit 32 may be bypassed.

Similarly, the analog interface circuit 32 converts signals from the microprocessor 28 into an output signal which is suitable for presentation to the electrically-controlled components associated with the plasma fuel reformer 12 (e.g., the fuel injector 38, the air inlet valve 40, or the power supply 36). In particular, the analog interface circuit 32, by use of a digital-to-analog (D/A) converter (not shown) or the like, converts the digital signals generated by the microprocessor 28 into analog signals for use by the electronically-controlled components associated with the fuel reformer 12 such as the fuel injector 38, the air inlet valve 40, or the power supply 36. It should be appreciated that, similar to the A/D converter described above, the D/A converter may be embodied as a discrete device or number of devices, or may be integrated into the microprocessor 28. It should also be appreciated that if any one or more of the electronically-controlled components associated with the plasma fuel reformer 12 operate on a digital input signal, the analog interface circuit 32 may be bypassed.

Hence, the electronic control unit 16 may be operated to control operation of the plasma fuel reformer 12. In particular, the electronic control unit 16 executes a routine including, amongst other things, a closed-loop control scheme in which the electronic control unit 16 monitors outputs of the sensors associated with the plasma fuel reformer 12 in order to control the inputs to the electronically-controlled components associated therewith. To do so, the electronic control unit 16 communicates with the sensors associated with the fuel reformer in order to determine, amongst numerous other things, the amount, temperature, and/or pressure of air and/or fuel being supplied to the plasma fuel reformer 12, the amount of oxygen in the reformate gas, the temperature of the catalyst 78, structures associated with the fuel reformer (e.g., the housing 48), or the reformate gas, along with the composition of the reformate gas. Armed with this data, the electronic control unit 16 performs numerous calculations each second, including looking up values in preprogrammed tables, in order to execute algorithms to perform such functions as determining when or how long the fuel reformer's fuel injector or other fuel input device is opened, controlling the power level input to the fuel reformer, controlling the amount of air advanced through air inlet valve, etcetera.

In an exemplary embodiment, the aforedescribed control scheme includes a routine for reducing electrical power consumption during operation of the plasma fuel reformer 12. In particular, in certain embodiments of the plasma fuel reformer, the plasma-generating assembly 42 may be controlled to selectively actuate and deactuate generation of the plasma arc 62 thereby reducing power consumption by the plasma fuel reformer 12. For example, if the catalyst 78 reaches a certain temperature, the reactions catalyzed by catalyst 78 can sustain the fuel reforming process without first advancing the air/fuel mixture through the plasma arc 62. In essence, at certain catalyst temperatures, the plasma fuel reformer 12 may be operated as a catalytic fuel reformer with the fuel reforming process being performed solely by the reactions catalyzed by the catalyst 78. During such periods of time (i.e., periods of time in which the catalyst temperature is above a certain temperature), generation of the plasma arc 62 may be ceased thereby eliminating the power consumption associated with arc generation.

One exemplary way to do so is by monitoring the temperature of the catalyst 78 as a feedback mechanism for a closed-loop control scheme. In particular, the temperature sensor 34 may be used as a closed-loop feedback mechanism to monitor the temperature of the catalyst 78 relative to a predetermined temperature value or "set point" which corresponds to a temperature or temperature range in which the plasma fuel reformer 12 can sustain fuel reforming without generation of the plasma arc 62. In other words, if the temperature of the catalyst 78 is above a set point temperature ($T_S$), the plasma-generating assembly 42 is operated so as to deactuate or otherwise cease generation of the plasma arc 62 thereby allowing the plasma fuel reformer 12 to be operated, in essence, as a catalytic fuel reformer in which the fuel reforming process is sustained by the chemical reactions catalyzed by the catalyst 78 in the reactor 44 without first exposing the air/fuel mixture to the plasma arc 62. However, if the temperature of the catalyst 78 drops below the set point ($T_S$), the plasma-generating assembly 42 is operated so as to re-actuate or otherwise commence generation of the plasma arc 62 thereby advancing the air/fuel mixture through the plasma arc 62 prior to advancement of the resultant reformate gas (or partially reformed gas) into the reactor 44 (and hence into contact with the catalyst 78).

The magnitude of the set point temperature ($T_S$) may be developed to fit the needs of a given design of a plasma fuel reformer or given catalyst. In regard to the exemplary embodiment described herein, the set point temperature ($T_S$) is 800° C.

As described above, generation of the plasma arc 62 is controlled via control of the power supply 36. In particular, the control unit 16 communicates with the power supply 36 in order to selectively supply an electrical current to the electrodes 54, 56. When the power supply 36 supplies a current to the electrodes 54, 56, the plasma arc 62 is generated across the electrode gap 58. When such a current is removed from the electrodes 54, 56, the plasma arc 62 ceases to be generated. Hence, generation of the plasma arc 62 is selectively controlled by the control unit 16 by way of control of the power supply 36. However, it should be appreciated that other control techniques for controlling generation of the plasma arc 62 are contemplated.

Figure 3:
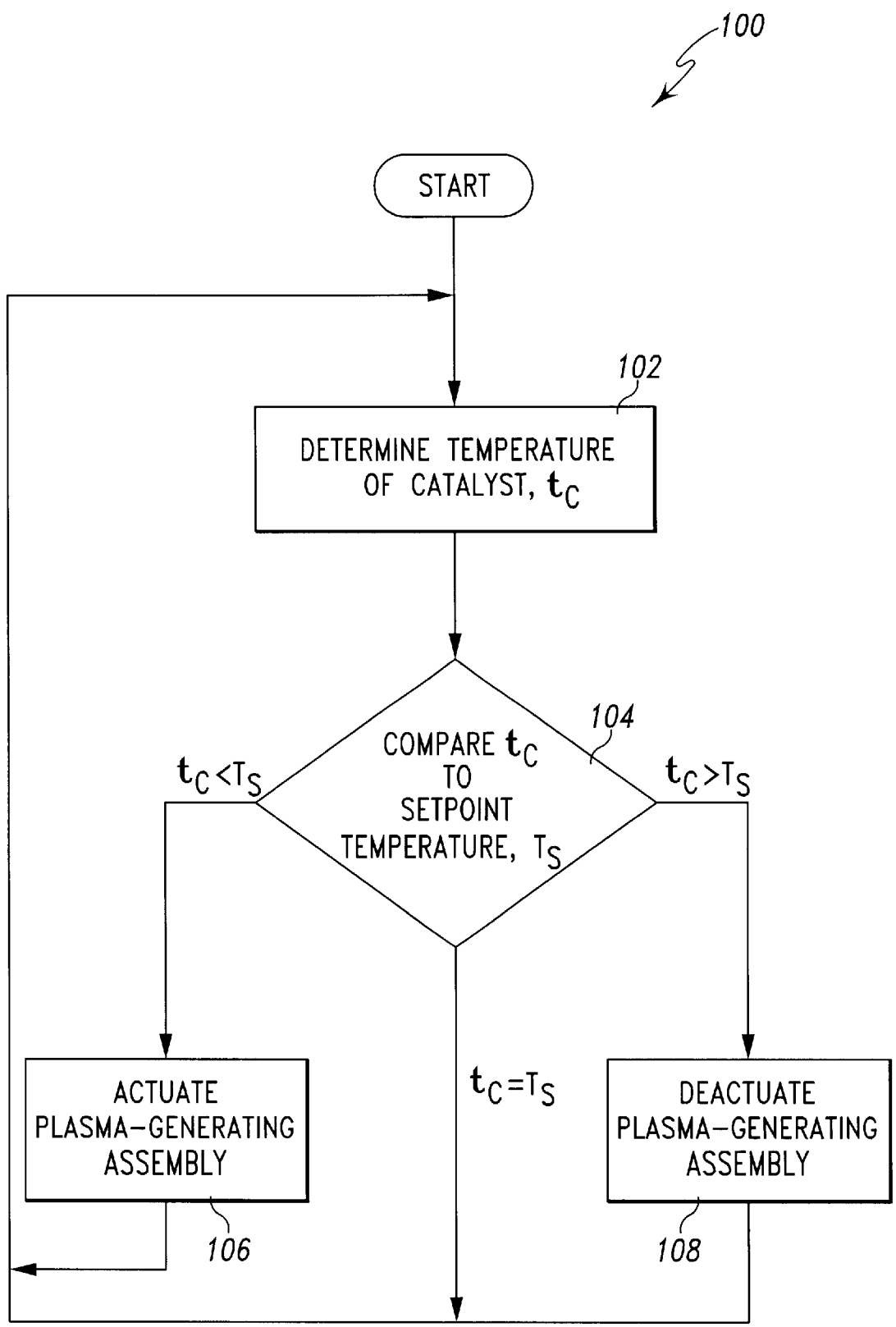
FIG. 3 is a flowchart of a control procedure executed by the control unit during operation of the fuel reforming assembly of FIG. 1.

Referring now to FIG. 3, there is shown a control routine 100 for reducing the power consumption of the plasma fuel reformer 12 during operation thereof. The control routine 100 begins with step 102 in which the control unit 16 determines the temperature of the catalyst 78 ($t_C$). In particular, the control unit 16 scans or otherwise reads the signal line 18 in order to monitor output from the temperature sensor 34. As described above, the output signals produced by the temperature sensor 34 are indicative of the temperature of the catalyst 78 ($t_C$) within the reactor 44. Once the control unit 16 has determined the temperature of the catalyst 78 ($t_C$), the control routine 100 advances to step 104.

In step 104, the control unit 16 compares the sensed temperature of the catalyst 78 ($t_C$) to the set point temperature ($T_S$). In particular, as described herein, a predetermined temperature value or set point may be established which corresponds to a temperature or temperature range at which the catalyst 78 can sustain the fuel reformer process without use of the plasma arc 62. As such, in step 104, the control unit 16 compares the temperature of the catalyst 78 ($t_C$) to the set point temperature ($T_S$). If the temperature of the catalyst 78 equals the set point temperature ($T_S$) (i.e., equals the predetermined temperature value or is within the temperature range), a control signal is generated and the control routine 100 loops back to step 102 to continue monitoring the output from the temperature sensor 34. However, if the temperature of the catalyst ($t_C$) is less than the set point temperature ($T_S$), a control signal is generated and the control routine advances to step 106, whereas if the temperature of the catalyst 78 ($t_C$) is greater than the set point temperature ($T_S$), a control signal is generated and the control routine advances to step 108.

In step 106, the control unit 16 actuates (or maintains actuation of) the plasma-generating assembly 42. In particular, the control unit 16 communicates with the power supply 36 in order to supply (or continue supplying) an electrical current to the electrodes 54, 56 thereby causing the plasma arc 62 to be generated across the electrode gap 58. As such, the air/fuel mixture being processed by the plasma fuel reformer 12 is exposed to the plasma arc 62. Thereafter, the control routine 100 loops back to step 102 to continue monitoring the output from the temperature sensor 34.

Referring back to step 104, if the temperature of the catalyst ($t_C$) is greater than the set point temperature ($T_S$), the control routine 100 advances to step 108. In step 108, the control unit 16 deactuates (or maintains deactuation of) the plasma-generating assembly 42. In particular, the control unit 16 communicates with the power supply 36 in order to remove an electrical current from the electrodes 54, 56 thereby causing the plasma arc 62 to cease to be generated across the electrode gap 58. As such, the air/fuel mixture being processed by the plasma fuel reformer 12 is not exposed to the plasma arc 62. In essence, the plasma fuel reformer 12 is operated as a catalytic fuel reformer in which the fuel reforming process is sustained by the chemical reactions catalyzed by the catalyst 78 in the reactor 44 without first exposing the air/fuel mixture to the plasma arc 62. The control routine 100 loops back to step 102 to continue monitoring the output from the temperature sensor 34.

For purposes of clarity of description, the concepts of the present disclosure have herein be described in regard to a plasma fuel reformer. However, the fuel reformer of the present disclosure may be embodied as any type of fuel reformer, and the claims attached hereto should not be interpreted to be limited to any particular type of fuel reformer unless expressly defined therein. Furthermore, it should be appreciated that the fuel reformer of the present disclosure may be embodied as any type of fuel reformer having an assembly for providing energy to a reforming process which is used in conjunction with a catalyst. For example, the concepts of the present disclosure may be used in the construction of a thermal fuel reformer, a steam fuel reformer, or any other type of partial oxidation fuel reformer.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

What is claimed is:

1. A method of operating a plasma fuel reformer, comprising the steps of:

determining if the temperature of a catalyst associated with the fuel reformer is greater than a predetermined temperature value and generating a temperature-above-value control signal in response thereto, and ceasing generation of a plasma arc in response to generation of the temperature-above-value control signal.

2. The method of claim 1, further comprising the steps of:

determining if the temperature of the catalyst is less than the predetermined temperature value and generating a temperature-below-value control signal in response thereto, and generating the plasma arc in response to generation of the temperature-below-value control signal.

3. The method of claim 2, wherein:

the plasma fuel reformer comprises an electrode, and the generating step comprises supplying an electrical current to the electrode.

4. The method of claim 1, wherein:

the plasma fuel reformer comprises an electrode, and the ceasing step comprises removing an electrical current from the electrode.

5. The method of claim 1, wherein the determining step comprises sensing the temperature of the catalyst with a temperature sensor.

6. The method of claim 1, wherein the determining step comprises sensing the temperature of a reformate gas with a temperature sensor.

7. The method of claim 1, wherein:

the fuel reformer comprises a reformer housing, and the determining step comprises sensing the temperature of the reformer housing with a temperature sensor.

8. A fuel reforming assembly, comprising:

a plasma fuel reformer having (i) a plasma arc generating assembly, and (ii) a catalyst, a temperature sensor, and a controller electrically coupled to both the fuel reformer and the temperature sensor, wherein the controller is configured to:

(a) monitor output from the temperature sensor to determine if the temperature of the catalyst is greater than a predetermined temperature value and generate a temperature-above-value control signal in response thereto, and (b) cease operation of the plasma arc generating assembly to cease generation of a plasma arc in response to generation of the temperature-above-value control signal.

9. The fuel reforming assembly of claim 8, wherein the controller is further configured to:
  determine if the temperature of the catalyst is less than the predetermined temperature value and generate a temperature-below-value control signal in response thereto, and
  operate the plasma arc generating assembly to generate the plasma arc in response to the temperature-below-value control signal.

10. The fuel reforming assembly of claim 9, wherein:
  the plasma arc generating assembly comprises an electrode, and the controller is further configured to operate the plasma arc generating assembly to supply an electrical current to the electrode in response to the temperature-below-value control signal.

11. The fuel reforming assembly of claim 8, wherein:
  the plasma arc generating assembly comprises an electrode, and
  the controller is further configured to operate of the plasma arc generating assembly to remove an electrical current from the electrode in response to generation of the temperature-above-value control signal.

12. A method of operating a plasma fuel reformer, the method comprising the steps of:
  generating a plasma arc during a first period of time,
  producing reformate gas during the first period of time,
  determining the temperature of a catalyst associated with the fuel reformer and generating a temperature-above-value control signal if the temperature of the catalyst is greater than a predetermined temperature value,
  ceasing generation of the plasma arc during a second period of time in response to generation of the temperature-above-value control signal, and
  producing reformate gas during the second period of time.

13. The method of claim 12, further comprising the steps of:
  determining the temperature of the catalyst and generating a temperature-below-value control signal if the temperature of the catalyst is less than the predetermined temperature value,
  resuming generation of the plasma arc during a third period of time in response to generation of the temperature-below-value control signal, and
  producing reformate gas during the third period of time.

14. The method of claim 13, wherein:
  the plasma fuel reformer comprises an electrode, and
  both the generating step and the resuming step comprise supplying an electrical current to the electrode.

15. The method of claim 12, wherein:
  the plasma fuel reformer comprises an electrode, and
  the ceasing step comprises removing an electrical current from the electrode.

16. The method of claim 15, wherein the determining step comprises sensing the temperature of the catalyst with a temperature sensor.

17. The method of claim 15, wherein the determining step comprises sensing the temperature of a reformate gas with a temperature sensor.

18. The method of claim 15, wherein:
  the fuel reformer comprises a reformer housing, and
  the determining step comprises sensing the temperature of the reformer housing with a temperature sensor.

* * * * *